(12) United States Patent
Roring

(10) Patent No.: US 9,090,222 B2
(45) Date of Patent: Jul. 28, 2015

(54) COVERING FOR AN AIRBAG

(71) Applicant: Albert Roring, Gronau-Epe (DE)

(72) Inventor: Albert Roring, Gronau-Epe (DE)

(73) Assignee: K.L.KASCHIER—und LAMINIER GmbH, Bad Bentheim-Gildehaus (DE)

( * ) Notice: Subject to any disclaimer, the term of this patent is extended or adjusted under 35 U.S.C. 154(b) by 0 days.

(21) Appl. No.: 14/345,362

(22) PCT Filed: Dec. 19, 2012

(86) PCT No.: PCT/DE2012/001217
§ 371 (c)(1),
(2) Date: Mar. 17, 2014

(87) PCT Pub. No.: WO2013/110250
PCT Pub. Date: Aug. 1, 2013

(65) Prior Publication Data
US 2014/0361519 A1    Dec. 11, 2014

(30) Foreign Application Priority Data

Jan. 25, 2012  (DE) .......................... 10 2012 001 461

(51) Int. Cl.
*B60R 21/216* (2011.01)
*B60R 21/215* (2011.01)
(52) U.S. Cl.
CPC ............. *B60R 21/216* (2013.01); *B60R 21/215* (2013.01); *B60R 2021/21537* (2013.01)
(58) Field of Classification Search
CPC   B60R 21/216; B60R 21/2165; B60R 21/215; B60R 2021/21537
USPC ...................................................... 280/728.3
See application file for complete search history.

(56) References Cited

U.S. PATENT DOCUMENTS

| 5,826,905 | A | * | 10/1998 | Tochacek et al. | .......... 280/743.1 |
| 7,100,941 | B2 | | 9/2006 | Riha | |
| 7,556,284 | B2 | | 7/2009 | Riha | |
| 8,096,577 | B2 | | 1/2012 | Roring | |
| 8,157,289 | B2 | | 4/2012 | Bittner | |
| 8,348,303 | B1 | | 1/2013 | Roring | |
| 2010/0117339 | A1 | | 5/2010 | Roring | |
| 2010/0308566 | A1 | * | 12/2010 | Roring et al. | ............... 280/728.3 |

FOREIGN PATENT DOCUMENTS

| DE | 20026379 U | 3/2002 |
| DE | 102008042657 A | 4/2010 |

\* cited by examiner

*Primary Examiner* — Drew Brown
(74) *Attorney, Agent, or Firm* — Andrew Wilford

(57) ABSTRACT

The invention relates to a covering for an airbag having at least one airbag that is articulated on the stationary covering region surrounding the airbag cover by a textile hinge, wherein the airbag cover and the covering region surrounding the airbag cover are formed from a sheet material made of plastic, the rear face of which supports a textile surface element having sacrificial threads (2) that extend substantially at right angles to the hinge axis (3) and tear in the region (A) of the hinge when the airbag is activated, and wherein the textile surface element also has stop threads that, when the airbag is activated, allow the airbag cover to pivot about the hinge axis (3) without tearing in the region of the hinge in order to hold the airbag cover securely after activation of the airbag, wherein the non-tearing stop threads are arranged such that said threads are compressed in the form of corrugations and/or loops only in region (A) of the hinge and therefore have a greater length there than in the regions (B) outside the hinge and the region compressed in the form of corrugations and/or loops is located in the plane of the textile surface element.

7 Claims, 1 Drawing Sheet

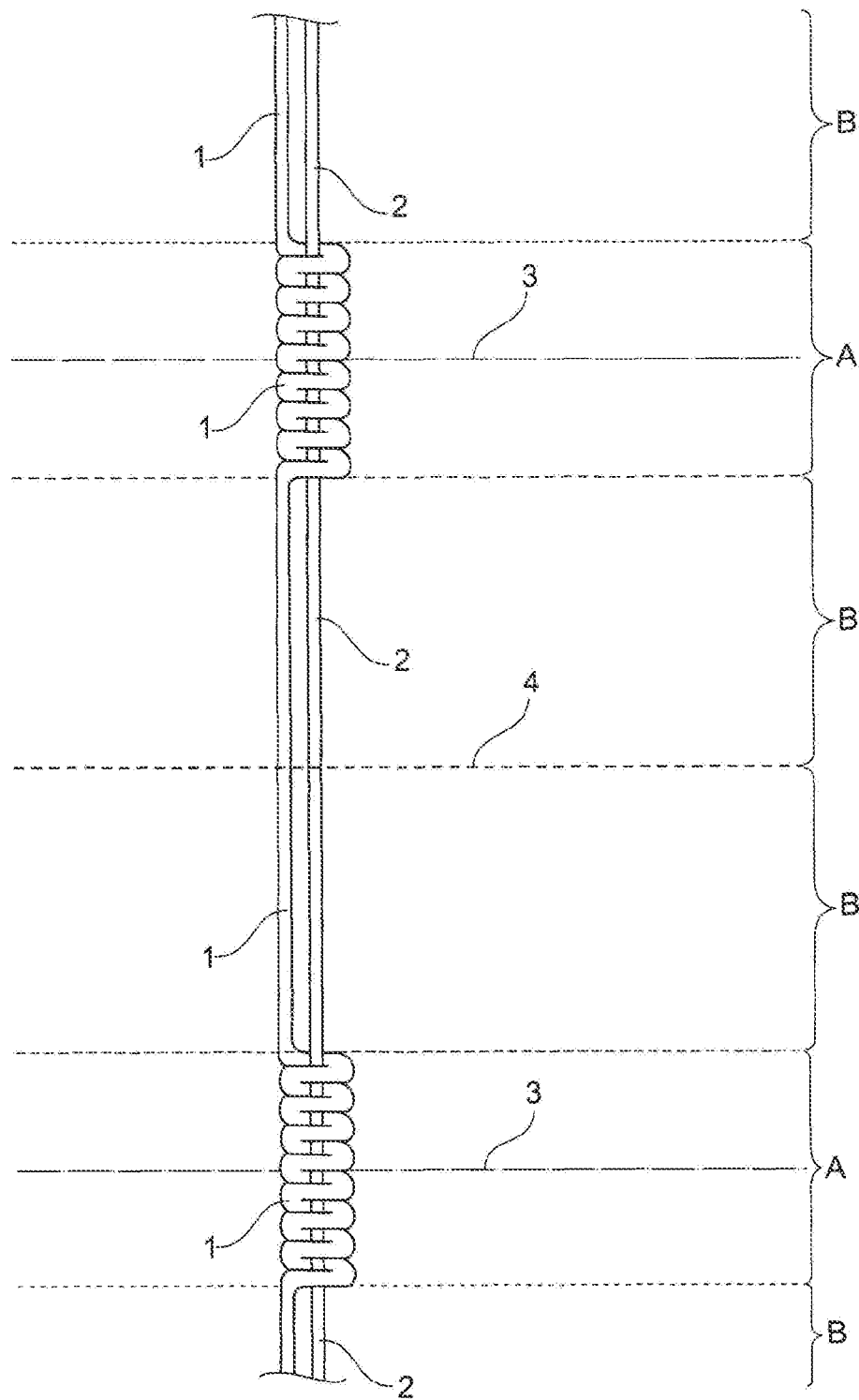

COVERING FOR AN AIRBAG

CROSS REFERENCE TO RELATED APPLICATIONS

This application is the US-national stage of PCT application PCT/DE2012/001217 filed 19 Dec. 2012 and claiming the priority of German patent application 102012001461.9 itself filed 25 Jan. 2012.

FIELD OF THE INVENTION

The invention relates to a cover assembly for an airbag and comprising at least one airbag cover panel pivotally connected by a textile hinge to the fixed support region surrounding the airbag cover, where the airbag cover and the support region surrounding the airbag cover panel are made of a flat plastic whose rear face carries a flat textile element that includes sacrificial filaments that extend essentially perpendicular to the hinge axis and tear in the region of the hinge when the airbag is activated, and where furthermore the flat textile element includes stop filaments that allow the airbag cover panel to rotate around the hinge axis without tearing in the region of the hinge when the airbag is activated, thereby securing the airbag cover panel in place after the airbag has been activated.

BACKGROUND OF THE INVENTION

The approach is well known in which the flat textile element of a plastic cover panel of an airbag is provided across its entire length with stop filaments that are corrugated so as to be able to expand when the cover panel covering the airbag swings away as the airbag is activated and is thereby held in place by the stop filaments, thereby preventing the cover panel from flying into the passenger compartment. What has been found, however, with this approach is that the stop filaments require a considerable quantity of filament material.

OBJECT OF THE INVENTION

The object of the invention is to save material for the stop filaments, and also to securely retain the flat textile element within the plastic of the cover panel.

SUMMARY OF THE INVENTION

This object is attained according to the invention by an approach wherein the non-tearing stop filaments are compressed into corrugations and/or loops only in the region of the hinge and are thus of a longer length than in the regions outside the hinge, and the region that is compressed into corrugations/or loops is located in the plane of the flat textile element.

As a result, the non-tearing stop filaments are compressed only in the region of the hinge, whereas they are uncompressed outside the hinge or the hinge region, with the result that the stop filaments and thus the flat textile element are anchored outside the hinge region securely in the plastic. To this end, it is also proposed that the non-tearing stop filaments extend essentially in a straight line in the regions outside the hinge and create between the individual stop filaments intermediate spaces that are large enough to enable the plastic material of the support region to enter into and fill these intermediate spaces.

This then both achieves improved anchoring of the flat textile element in the plastic of the flat sheet material of the cover panel and also achieves a savings in material since the amount of filament used for the stop filaments outside the hinge region is significantly lower.

An approach is preferably proposed here whereby in the region of the hinge the stop filaments form a narrow strip of high filament density that covers the hinge region and is parallel to the hinge axis.

In order to prevent all of the stop filaments from tearing at the same moment but instead to enable the filaments to tear in succession within a certain time interval, an approach is proposed whereby two or more different types of sacrificial filaments are provided in the flat textile element that are of different length and/or thickness, with the result that at least one type of sacrificial filament tears earlier than another type of sacrificial filament when the airbag cover panel opens and rotates. What is proposed here is an approach whereby three or more different types of sacrificial filaments allow the sacrificial filaments to tear in succession one after the other during the opening action. These two proposals also result in a faster rotational motion by the cover panel.

An especially advantageous approach is one where the stop filaments at regular intervals form narrow mutually parallel strips of high density, and the region of the flat textile element includes a separation line between the strips of high density. As a result, a flat textile can be produced as a web sheet for multiple airbag cover assemblies, and after being formed the web sheet only needs to be divided up into individual sections for the airbag cover assemblies.

BRIEF DESCRIPTION OF THE DRAWING

An illustrated embodiment of the invention is shown schematically in the drawing and described in more detail below.

SPECIFIC DESCRIPTION OF THE INVENTION

The cover assembly of an airbag comprising at least one airbag cover panel is composed of a plastic material in sheet form, a flat textile element being fused onto the rear face of this cover panel, which element is composed of a knitted fabric, including extra stop filaments 1 and sacrificial filaments 2 within the flat textile element.

The schematic diagram shows only a single stop filament 1 including the adjacently located sacrificial filament 2 parallel thereto, the remaining filaments of the fabrics being omitted. An axis 3 of the hinge is oriented perpendicular to the direction of extension for the filaments 1 and 2 with the hinge regions A located on both sides of the hinge axis 3. The region of a flat textile element B is identified outside the hinge region A.

The sacrificial filaments 2 in the hinge region A continue on in a straight line essentially unmodified and uncompressed perpendicular to the hinge axis 3, whereas the stop filaments are compressed in the hinge region, i.e. they are of considerably longer length than the sacrificial filaments 2. The stop filaments 2 are compressed by shaping them into corrugations or loops in the hinge region A. The terms corrugations and loops are, however, also understood here to include serpentine, meander, helical, or coil shapes for the stop filament 1.

Conversely, the stop filaments 1 in the regions B that are located between the hinge regions extend essentially uncompressed, and thus essentially in a straight line parallel to the sacrificial filaments 2, with the result that the stop filaments lie in a less dense configuration in regions B outside the hinge region A, and this allows the plastic material of the cover panel to more effectively reach between the filaments so that the flat textile element has better adhesion in the plastic.

The flat textile element is preferably produced as a web sheet with multiple regions A perpendicular to the longitudinal axis of the web sheet repeatedly following in succession, thereby enabling the web sheet to be cut into individual sections after production (separation line 4), such that each section can be used for one airbag.

The sacrificial filament 2 in the schematic drawing is shown passing through the coiled loops formed by the stop filament 1 in the hinge region A. Alternatively, however, the sacrificial filament can also be located next to the compressed region of the stop filament, or above or below this region.

In another embodiment, different types of sacrificial filaments 2 are provided in the flat textile element. As a result, at least one other type of sacrificial filament is provided beside the sacrificial filaments which tear first, these other filaments tearing at a later point in time due to their greater thickness and/or greater length. It is in fact possible here to arrange three or more types adjacent to each other in the flat element, which types increase in thickness and/or length from one type to the next, thereby enabling a continuous tearing to occur successively in terms of time.

The invention claimed is:

1. A cover assembly for an airbag, the assembly comprising at least one airbag cover panel pivotally connected by a textile hinge to a fixed support region surrounding the airbag cover panel, wherein the airbag cover panel and the support region surrounding the airbag cover are composed of a flat plastic panel whose rear face supports a flat textile element that includes sacrificial filaments that extend essentially perpendicular to a hinge axis and tear at the hinge when the airbag is activated, the flat textile element furthermore includes stop filaments that allow the airbag cover panel to rotate around the hinge axis without tearing in the region of the hinge when the airbag is activated, thereby securing the airbag cover panel in place after the airbag has been activated, the non-tearing stop filaments are compressed in corrugations and/or loops only in the region of the hinge and are thus longer than in the regions outside the hinge, and the corrugations and/or loops are located in a plane of the flat textile element.

2. The cover assembly according to claim 1, wherein the non-tearing stop filaments extend essentially in a straight line in regions outside the hinge and form intermediate spaces between the individual stop filaments that are large enough to allow plastic material of the support region to be extend into these intermediate spaces.

3. The cover assembly according to claim 1, wherein the stop filaments form in the region of the hinge a narrow strip of high filament density that covers the hinge region and is parallel to the hinge axis.

4. The cover assembly according to claim 1, wherein two or more different types of sacrificial filaments are provided in the flat textile element and are of different length and/or thickness so that at least one type of sacrificial filament tears earlier than another type of sacrificial filament when the airbag cover panel is opened and rotates.

5. The cover assembly according to claim 4, wherein the types of sacrificial filaments tear successively in terms of time during the opening action when there are three or more different types of sacrificial filaments.

6. A flat textile for multiple airbag cover assemblies as defined in claim 1, wherein the stop filaments form parallel strips of high density at regular intervals, the strips being arranged perpendicular to a longitudinal axis of the flat textile element that is designed as a web sheet, and that the regions of the flat textile element include one separation line between the strips of high density at which the web sheet can be separated into individual sections, each having one strip of high density.

7. The cover assembly defined in claim 1, wherein the stop filaments are each formed at the hinge as a succession of loops and a respective one of the sacrificial filaments extends through a respective one of the successions of loops of each stop filament.

* * * * *